(12) United States Patent
Nehring, Jr.

(10) Patent No.: US 12,398,076 B1
(45) Date of Patent: Aug. 26, 2025

(54) MITIGATION OF ALKALI-SILICA REACTION IN CONCRETE USING LITHIUM-STABILIZED DISPERSION OF SILICA

(71) Applicant: Nyacol Nano Technologies, Inc., Ashland, MA (US)

(72) Inventor: Robert J. Nehring, Jr., Hopedale, MA (US)

(73) Assignee: NYACOL NANO TECHNOLOGIES, INC., Ashland, MA (US)

( * ) Notice: Subject to any disclaimer, the term of this patent is extended or adjusted under 35 U.S.C. 154(b) by 536 days.

(21) Appl. No.: 17/722,057

(22) Filed: Apr. 15, 2022

Related U.S. Application Data

(60) Provisional application No. 63/175,790, filed on Apr. 16, 2021.

(51) Int. Cl.
| | |
|---|---|
| *C04B 28/26* | (2006.01) |
| *C04B 14/06* | (2006.01) |
| *C04B 14/14* | (2006.01) |
| *C04B 14/28* | (2006.01) |
| *C04B 103/60* | (2006.01) |
| *C04B 111/20* | (2006.01) |

(52) U.S. Cl.
CPC .............. *C04B 28/26* (2013.01); *C04B 14/06* (2013.01); *C04B 14/14* (2013.01); *C04B 14/28* (2013.01); *C04B 2103/603* (2013.01); *C04B 2111/2023* (2013.01)

(58) Field of Classification Search
CPC ......... C04B 28/26; C04B 14/06; C04B 14/14; C04B 14/28; C04B 2103/603; C04B 2111/2023
See application file for complete search history.

(56) References Cited

U.S. PATENT DOCUMENTS

| | | | | |
|---|---|---|---|---|
| 2002/0053304 A1* | 5/2002 | Pelot | ..................... | C04B 20/026 106/716 |
| 2015/0299041 A1 | 10/2015 | Wetherell et al. | | |
| 2018/0258593 A1* | 9/2018 | Hills | ........................ | E01C 7/187 |
| 2020/0377372 A1 | 12/2020 | Belkowitz et al. | | |

FOREIGN PATENT DOCUMENTS

| | | | | |
|---|---|---|---|---|
| EP | 2213620 B1 * | 1/2017 | ............. | B82Y 30/00 |

OTHER PUBLICATIONS

Fernandes et al. (Structure-property relationships and densification-crystallization behaviors of simplified lithium silicate glass compositions, Ceramics International, 40, pp. 129-140) (Year: 2014).*
Yardimci et al. (Effect of fine to coarse aggregate ratio on the rheology and fracture energy of steel fibre reinforced self-compacting concretes, Sādhanā, vol. 039, Part 6, pp. 1447-1469, Indian Academy of Science (Year: 2014).*
Michael D.A. Thomas et al., The Use of Lithium to Prevent or Mitigate Alkali-Silica Reaction in Concrete Pavements and Structures, US Department of Transportation, Federal Highway Administration (FHWA)—Publication No. FHWA-HRT-06-133, Mar. 2007, pp. 1-50.
Michael D.A. Thomas et al., Alkali-Aggregate Reactivity (AAR) Facts Book, US Department of Transportation, Federal Highway Administration (FHWA)—Report No. FHWA-HIF-13-019, Mar. 2013, pp. 1-224.
Standard Test Method for Potential Alkali Reactivity of Aggregates (Mortar-Bar Method), ASTM International, Designation: C1260-14, Aug. 2014, pp. 1-5.
Standard Test Method for Determining the Potential Alkali-Silica Reactivity of Combinations of Cementitious Materials and Aggregate (Accelerated Mortar-Bar Method), ASTM International, Designation: C1567-13, Feb. 2013, pp. 1-6.
Standard Practice for Determining the Reactivity of Concrete Aggregates and Selecting Appropriate Measures for Preventing Deleterious Expansion in New Concrete Construction, American Association of State Highway and Transportation Officials (AASHTO), Desgination: PP 65-11, Apr. 2016, pp. 1-25.
Michael D.A. Thomas et al., Selecting Measures to Prevent Deleterious Akali-Silica Reaction in Concrete: Rationale for the AASHTO PP65 Prescriptive Approach, US Department of Transportation, Federal Highway Administration (FHWA)—Report No. FHWA-HIF-13-002, Oct. 2012, pp. 1-58.
Mohamed Zeidan et al., Effect of colloidal nano-silica on alkali-silica mitigation, Journal of Sustainable Cement-Based Materials, 2017, vol. 6, No. 2, pp. 126-138.
K. Sobolev, et al., Engineering of SiO2 Nanoparticles for Optimal Performance in Nano Cement-Based Materials, Nanotechnology in Construction 3, 2009, pp. 139-148.
Charles Tremblay et al., Effectiveness of Lithium-Based Products in Concrete Made with Canadian Natural Aggregates Susceptible to Alkali-Silica Reactivity, ACI Materials Journal, Title No. 104-M23, Apr. 2007, pp. 195-205.
Dynasylan Silbond Pure Safety Data Sheet, version 3.1, Silbond Corporation, Apr. 24, 2017, pp. 1-13.
Tetramethy orthosilicate for synthesis, Safety Data Sheet, version 8.3, EMD Millipore Corporation, Feb. 7, 2022, pp. 1-11.
Colloidal Silica Additives for Concrete, Nyacol Nano Technologies, Inc., published on www.nyacol.com, Jun. 19, 2020, pp. 1-3.
Nyacol Additives for Controlling ASR in Concrete—Test Report, Nyacol Nano Technologies, Inc., Nov. 2020, pp. 1-5.
Michael D.A. Thomas et al., Methods for Evaluating and Treating ASR-Affected Structures: Results of Field Application and Demonstration Projects—vol. I: Summary of Findings and Recommendations, Nov. 2013, US Department of Transportation, Federal Highway Administration (FHWA)—Publication No. FHWA-HIF-14-0002, pp. 1-80.

(Continued)

*Primary Examiner* — Bryan D. Ripa
*Assistant Examiner* — Anastasia A. Kuvayskaya
(74) *Attorney, Agent, or Firm* — KRIEGSMAN & KRIEGSMAN

(57) ABSTRACT

Method and composition for mitigating alkali-silica reaction in concrete. According to one embodiment, the composition may comprise a lithium-stabilized colloidal silica or a powder that is obtained from a lithium-stabilized colloidal silica. The composition may be used as an admixture for a concrete mix that also comprises cement, one or more aggregates, water and, optionally, one or more supplementary cementitious materials.

17 Claims, No Drawings

(56) References Cited

OTHER PUBLICATIONS

Zachoriah J. Ballard et al., Alternate Mitigation Materials for Alkali-Silica Reaction (ASR) in Concrete, Colorado Department of Transportation—DTD Applied Research and Innovation Branch, Report CDOT-2008-10, Nov. 2008, pp. 1-74.
Patricia Baer, Alkali Silica Reaction—Proactive Avoidance, Pennsylvania DOT Guidance Document, presented at 2017 Mid-Atlantic Quality Assurance Workshop, Feb. 8, 2017, pp. 1-3.
Patricia Baer, ASR: Alkali-Silica Reaction, Report, Pennsylvania Department of Transportation, presented at 2017 Mid-Atlantic Quality Assurance Workshop, Feb. 8, 2017, pp. 1-7.
Jon Belkowitz, An Analysis of the Use of Nano Silica to Alkali-Silica Reaction in Concrete, Dissertation—Stevens Institute of Technology, Published by ProQuest LLC, 2015, pp. 1-275.
15th International Conference on Alkali-Aggregate Reaction in Concrete (ICAAR), Published Papers from the Proceedings, Jul. 2016, pp. 1-176.
A.M. Said et al., Properties of concrete incorporating nano-silica, Construction and Building Materials, vol. 36, Jul. 15, 2012, pp. 838-844.
Kevin J. Folliard et al., Interim Recommendations for the Use of Lithium to Mitigate or Prevent Alkali-Silica Reaction (ASR), Jul. 2006, US Department of Transportation, Federal Highway Administration (FHWA)—Report No. FHWA-HRT-06-073, pp. 1-95.
Evaluation of Alkali Silica Reactivity (ASR) Mortar Bar Testing (ASTM C1260 and C1567) at 14 days and 28 days, Report, Portland Cement Association, Durability Subcommittee, 2011, pp. 1-4.
Kevin J. Folliard et al., Mitigation of alkali-silica reaction in US highway concrete, Proceedings of the Institution of Civil Engineers (ICE), Construction Materials, vol. 169, Issue CM4, Paper 1600007, Aug. 2016, pp. 215-222.
Standard Test Method for Determination of Length Change of Concrete Due to Alkali-Silica Reaction, ASTM International, Designation: C1293-20a, Jul. 2020, pp. 1-6.
Standard Specification for Portland Cement, ASTM International, Designation: C150/C150M-21, Aug. 2021, pp. 1-9.
Nyacol® Introduces LiSol™ 3 to its Existing Line of Lithium-based Concrete Surface Treatment Products, Nyacol Nano Technologies, Ashland, MA (2018).
Colloidal Silica Additives for Concrete, Nyacol Nano Technologies, Ashland, MA (Jun. 19, 2020).

\* cited by examiner

MITIGATION OF ALKALI-SILICA REACTION IN CONCRETE USING LITHIUM-STABILIZED DISPERSION OF SILICA

CROSS-REFERENCE TO RELATED APPLICATIONS

The present application claims the benefit under 35 U.S.C. 119(e) of U.S. Provisional Patent Application No. 63/175,790, inventor Robert J. Nehring, Jr., filed Apr. 16, 2021, the disclosure of which is incorporated herein by reference.

BACKGROUND OF THE INVENTION

The present invention relates generally techniques for mitigating alkali-silica reaction in concrete and relates more particularly to a novel technique for mitigating alkali-silica reaction in concrete.

Concrete, which is a well-known construction material, is a composite substance that typically includes a mixture of a cement, an aggregate, and water. Typically, in the formation of concrete, the cement component reacts with the water component, via a hardening or curing process called concrete hydration, to form a porous binder or matrix. The aggregate component, which is typically made of fine or coarse particulates of materials like sand, gravel, and crushed stone, is dispersed within and bound together by the aforementioned cementitious matrix.

Despite its prevalence as a construction material, concrete suffers from some shortcomings. One such shortcoming is that concrete is susceptible to certain types of chemical self-degradation that can adversely affect the durability of structures made therewith. For example, a common type of chemical self-degradation that occurs in concrete is a chemical reaction known as alkali-silica reaction (ASR). The problem of alkali-silica reaction in concrete is known throughout the world and has been studied for several decades. Simply stated, alkali-silica reaction typically involves a reaction, occurring in the pores of concrete, between reactive silica of the aggregate component and alkali and hydroxide ions of the cement component. The foregoing reaction between reactive silicate and alkali and hydroxide ions results in the formation of a gel. This gel, in turn, imbibes nearby water from the cementitious matrix, causing the gel to expand. Such expansion of the gel can lead to a cracking of the concrete and can eventually result in the premature failure of a structure made with such concrete.

Because the deleterious effects of alkali-silica reaction in concrete are well-known, certain methods have been devised to test for and/or to predict alkali-silica reaction in concrete structures. One such method is commonly known as the concrete prism test, which is a one-year test that is detailed in ASTM Standard C1293, 2020, "Standard Test Method for Determination of Length Change of Concrete Due to Alkali-Silica Reaction," ASTM International, West Conshohocken, PA, which is incorporated herein by reference.

Another method is commonly known as the accelerated mortar bar method, which is a 14-day test that is detailed in ASTM Standard C1260, 2014, "Standard Test Method for Potential Alkali Reactivity of Aggregates (Mortar-Bar Method)," ASTM International, West Conshohocken, PA, and in ASTM Standard C1567, 2013, "Standard Test Method for Determining the Potential Alkali-Silica Reactivity of Combinations of Cementitious Materials and Aggregate (Accelerated Mortar-Bar Method)," ASTM International, West Conshohocken, PA, both of which are incorporated herein by reference. ASTM Standard C1260 is used for screening aggregates, and ASTM C1567 is used for screening cementitious and aggregate combinations. According to the accelerated mortar-bar method, a standard formulation of cement and carefully graded aggregate is prepared at a set water-to-cement ratio, bars are cast and cured with measurement pins, and then aged in 80° C., 1 N NaOH solution. Measurements are made periodically to determine the expansion of the mortar bars. Aggregates are classified based on the unmitigated alkali-silica reaction at 14 days.

Several approaches have been taken in an attempt to mitigate alkali-silica reaction in concrete. Some of these approaches have included avoiding reactive aggregate, limiting the alkali content of the concrete, using blended cement, using supplementary cementitious materials (SCM), using lithium nitrate as an admixture, or some combination of these approaches. Some of the foregoing approaches are detailed in a standard known as AASHTO Designation: PP65-11, 2016, "Standard Practice for Determining the Reactivity of Concrete Aggregates and Selecting Appropriate Measures for Preventing Deleterious Expansion in New Concrete Construction," American Association of State Highway and Transportation Officials, Washington, DC, which is incorporated herein by reference. Additional information is disclosed in "Selecting Measures to Prevent Deleterious Alkali-Silica Reaction in Concrete: Rationale for the AASHTO PP65 Prescriptive Approach," U.S. Department of Transportation, Federal Highway Administration (2012), Washington, DC, which is incorporated herein by reference.

As noted above, one approach that has been taken to combat alkali-silica reaction has been to include certain types of supplementary cementitious materials in the concrete mixture. Examples of such supplementary cementitious materials include Class F fly ash, silica fume, and metakaolin. Such supplementary cementitious materials have been investigated and employed for several decades. In fact, the use of such materials is currently recommended at certain minimum percentage levels to mitigate alkali-silica reaction. Supplementary cementitious materials reduce the amount of cement that is used and supplement the cement with various sources of silica or alumina that react with the cement and reduce the alkalinity of the pore solution by forming calcium silica hydrate or calcium aluminate.

Different supplementary cementitious materials have their own set of advantages and disadvantages. For example, fly ash improves the workability of concrete; however, for highly reactive aggregates, the amount of fly ash that is needed can be very high, reducing the relative amount of cement. Such a decrease in cement content can create mix design issues, such as short-term strength development. Moreover, fly ash resources are now in decline due to the change in power generation from coal (from which fly ash is primarily derived) to gas. As a result, sources of fly ash of suitable quality are also now in short supply and, in a few years, will be exhausted.

Silica fume, another type of supplementary cementitious material, has been shown to be effective in reducing alkali-silica reaction; however, this material is in the form of a powder that is difficult to handle and to disperse uniformly. Moreover, the availability of silica fume is limited as its production is principally as a byproduct. Slurries of silica fume have been developed, but they are difficult to formulate and maintain required water-to-cement ratios.

As noted above, an alternative mitigating technique to the use of supplementary cementitious materials is to include lithium nitrate in the concrete mixture. Lithium nitrate has been demonstrated to be an effective material for mitigation of alkali-silica reaction. In practice, lithium nitrate is typically added to the concrete mixture as a 30% lithium nitrate solution. Unfortunately, however, with the increase in demand for lithium as a result of the electric vehicle (EV) automotive trend and other lithium ion battery applications, the price of lithium has skyrocketed, and the availability of lithium has become very tight.

Consequently, there is clearly a need for an alternative technology that can prevent alkali-silica reaction without relying on materials that are declining in supply or quality and that are increasing in cost.

In a Ph.D. dissertation entitled "An Analysis of the Use of Nano Silica to Alkali-Silica Reaction in Concrete," Jon Belkowitz, Stevens Institute of Technology (2015), which is incorporated herein by reference, there is disclosed the use of various sodium-stabilized nano-silica dispersions (e.g., 3-6 nm, 15 nm, and 45 nm silica nanoparticles) to mitigate alkali-silica reaction in concrete. Extensive work was done on gel formation, microstructure development, and different methods for assessing alkali-silica reaction. The expansion results were tested and presented using the ASTM C1260 and ASTM C1567 test procedures referenced above.

The present inventor believes that the results in the foregoing dissertation were encouraging, but not completely satisfactory, as the expansion at 28 days was above the acceptable 0.1% limit in all cases, except for the highest concentrations of two of the three types of dispersions (i.e., 15 nm and 45 nm). It is believed by the present inventor that the agglomeration of the smaller particle size colloidal silica was likely an issue, as increased expansion was noted as the dosage increased.

In Zeidan et al., "Effect of colloidal nano-silica on alkali-silica mitigation," Journal of Sustainable Cement-Based Materials, 6 (2): 126-138 (2017), which is incorporated herein by reference, there is disclosed a study involving the use of a 35 nm, 50% solids colloidal silica in mitigating alkali-silica reaction. (It is believed by the present inventor that the aforementioned colloidal silica is most likely sodium-stabilized.) In the study, the above-described ASTM C1260 and ASTM C1567 test procedures were used to measure expansion at 14 days, 28 days, and 80 days. The colloidal silica was dosed at 3% and 6% replacement rates of the Type II/IV cement. The results showed a reduction in expansion at 14 days and 28 days; however, the present inventor notes that the results were well above the 0.1% maximum allowed by the Federal Aviation Administration (FAA) or the Federal Highway Administration (FHWA). The authors also studied replacement of cement with Class F fly ash and metakaolin, both alone and with the colloidal silica. Several of these formulations showed promise at 14 days; however, at 28 days, all the results were above 0.1%.

In U.S. Patent Application Publication No. US 2020/0377372 A1, inventors Belkowitz et al., which was published Dec. 3, 2020, and which is incorporated herein by reference, there is disclosed the use of alumina-modified colloidal silica nanoparticles to mitigate alkali-silica reaction in cementitious compositions. Although the present inventor believes that the results detailed in the above-noted publication show some benefit, the present inventor notes that the additive levels are high and that there is no data on the use of the additives without fly ash.

In summary, the work discussed above is limited in teaching an effective additive that can be used with highly reactive aggregate to suppress alkali-silica reaction below 0.1% expansion at 14 days and 28 days when tested by the ASTM C1260 or ASTM C1567 test procedures.

Colloidal silica is produced commercially by several methods. One method involves the deionization of sodium silicate to form silicic acid, a monomeric form of $SiO_2$. The silicic acid is condensation polymerized using an alkali catalyst to form nuclei which are grown under controlled conditions to a desired particle size or surface area. Typically, the alkali is sodium or potassium hydroxide, but it is known in the literature to use amines and ammonia, and lithium is contemplated. A second method for producing colloidal silica is the sol-gel method, in which tetraethyl orthosilicate (TEOS) or tetramethyl orthosilicate (TMOS) is hydrolyzed to form the silicic acid monomer, and then the monomer is condensation polymerized to form silica particles. The second method is not as preferred as the first method due to the high cost of materials.

Nyacol Nano Technologies, Inc. (Ashland, MA), the present applicant/assignee, sells certain lithium-stabilized colloidal silicas under the trademarks LiSol™ 3 lithium-stabilized colloidal silica and LiSol™ 6 lithium-stabilized colloidal silica. These products are advertised for use as topical concrete treatments to densify the surface of poured concrete, thereby increasing abrasion and chip resistance. Product literature for the LiSol™ 6 lithium-stabilized colloidal silica also states that topical treatment of concrete therewith reduces alkali-silica reaction.

The government has studied the topical treatment of concrete with various materials including lithium nitrate (but not including lithium-stabilized colloidal silica). In particular, in the above-described 2016 AASHTO report, it is disclosed that, when applied as a topical treatment, lithium nitrate is not effective in reducing alkali-silica reaction. In addition, the aforementioned report suggests that the lack of efficacy of lithium nitrate in reducing alkali-silica reaction is due to its limited penetration into concrete. In view of these results for lithium nitrate and in view of the lack of any known testing of lithium-stabilized colloidal silica as a topical treatment for alkali-silica reaction, the efficacy of lithium-stabilized colloidal silica as a topical treatment for alkali-silica reaction seems unlikely.

Other documents that may be of interest may include the following, all of which are incorporated herein by reference: U.S. Patent Application Publication No. US 2015/0299041 A1, inventors Wetherell et al., published Oct. 22, 2015; and Said et al., "Properties of concrete incorporating nano-silica," *Construction and Building Materials*, 36: 838-844 (2012);

SUMMARY OF THE INVENTION

It is an object of the present invention to provide a novel technique for mitigating alkali-silica reaction in concrete.

According to one aspect of the invention, there is provided a concrete mix, the concrete mix comprising (a) a cement; (b) an aggregate; (c) an alkali-silica reaction mitigating agent, the alkali-silica reaction mitigating agent comprising at least one of (i) a lithium-stabilized dispersion of silica and (ii) a powder obtained by drying the lithium-stabilized dispersion of silica; and (d) water.

In a more detailed feature of the invention, the lithium-stabilized dispersion of silica may comprise at least one of a lithium-stabilized dispersion of fumed silica, a lithium-stabilized dispersion of silica gel, a lithium-stabilized dispersion of silica fume, and a lithium-stabilized dispersion of precipitated silica.

In a more detailed feature of the invention, the lithium-stabilized dispersion of silica may comprise a lithium-stabilized colloidal silica.

In a more detailed feature of the invention, the lithium-stabilized colloidal silica may comprise silica particles having a particle size of about 3 nm to 125 nm.

In a more detailed feature of the invention, the lithium-stabilized colloidal silica may comprise silica particles having a particle size of about 6 nm.

In a more detailed feature of the invention, the lithium-stabilized colloidal silica may have a density of about 1.085 g/ml, a pH of about 9.8, a % $Li_2O$ of about 0.20, a viscosity of about 4 cps, a conductivity of about 4130 uS, a gravimetric solids percentage of about 13.7%, a surface area by Sears method of about 513 $m^2/g$, and a calculated particle size of about 5.3 nm.

In a more detailed feature of the invention, the lithium-stabilized colloidal silica may comprise silica particles having a particle size of about 3 nm.

In a more detailed feature of the invention, the alkali-silica reaction mitigating agent may comprise the powder obtained by drying a lithium-stabilized dispersion of silica, and the lithium-stabilized dispersion of silica may be a lithium-stabilized colloidal silica.

In a more detailed feature of the invention, the powder may have a bulk density of about 0.86 g/ml, a BET surface area of about 500 $m^2/g$, a loss on drying at 105° C. of about 12.6%, a 10% slurry pH of about 10.5, a % $SiO_2$ of about 83, a % $Li_2O$ of about 1.0, and a color of about 91/−0.5/0.5.

In a more detailed feature of the invention, the powder may have a bulk density of about 0.071 g/ml, a BET surface area of about 800 $m^2/g$, a loss on drying at 105° C. of about 10-15%, a 20% slurry pH of about 9-10, a % $SiO_2$ of about 86.5, a % $Li_2O$ of about 1.04, and a color of about 93/0.0/0.6.

In a more detailed feature of the invention, the concrete mix may further comprise one or more supplementary cementitious materials.

According to another aspect of the invention, there is provided a concrete mix, the concrete mix comprising (a) cement; (b) sand; (c) stone/aggregate; (d) water; and (e) a lithium-stabilized colloidal silica.

In a more detailed feature of the invention, the concrete mix may be a 3000 psi concrete mix for preparing a 1 cubic yard of concrete, the cement may be present in the concrete mix in an amount constituting 517 lbs, the sand may be present in the concrete mix in an amount constituting 1560 lbs, the stone/aggregate may be present in the concrete mix in an amount constituting 1600 lbs, the water may be present in the concrete mix in an amount constituting 275 lbs, and the lithium-stabilized colloidal silica may be present in the concrete mix in an amount ranging from 3 lbs to 240 lbs.

According to another aspect of the invention, there is provided a method of making a concrete structure, the method comprising the steps of (a) providing a concrete mix, the concrete mix comprising (i) a cement, (ii) an aggregate, (iii) an alkali-silica reaction mitigating agent, the alkali-silica reaction mitigating agent comprising at least one of (A) a lithium-stabilized dispersion of silica and (B) a powder obtained by drying the lithium-stabilized dispersion of silica, and (iv) water; (b) then, casting the concrete mix to a desired form; and (c) allowing the cast concrete mix to cure.

In a more detailed feature of the invention, the lithium-stabilized dispersion of silica may comprise at least one of a lithium-stabilized dispersion of fumed silica, a lithium-stabilized dispersion of silica gel, a lithium-stabilized dispersion of silica fume, and a lithium-stabilized dispersion of precipitated silica.

In a more detailed feature of the invention, the lithium-stabilized dispersion of silica may comprise a lithium-stabilized colloidal silica.

In a more detailed feature of the invention, the lithium-stabilized colloidal silica may comprise silica particles having a particle size of about 3 nm to 125 nm.

In a more detailed feature of the invention, the lithium-stabilized colloidal silica may comprise silica particles having a particle size of about 6 nm.

In a more detailed feature of the invention, the lithium-stabilized colloidal silica may have a density of about 1.085 g/ml, a pH of about 9.8, a % $Li_2O$ of about 0.20, a viscosity of about 4 cps, a conductivity of about 4130 uS, a gravimetric solids percentage of about 13.7%, a surface area by Sears method of about 513 $m^2/g$, and a calculated particle size of about 5.3 nm.

In a more detailed feature of the invention, the lithium-stabilized colloidal silica may comprise silica particles having a particle size of about 3 nm.

In a more detailed feature of the invention, the alkali-silica reaction mitigating agent may comprise the powder obtained by drying the lithium-stabilized dispersion of silica, and the lithium-stabilized dispersion of silica may be a lithium-stabilized colloidal silica.

In a more detailed feature of the invention, the powder may have a bulk density of about 0.86 g/ml, a BET surface area of about 500 $m^2/g$, a loss on drying at 105° C. of about 12.6%, a 10% slurry pH of about 10.5, a % $SiO_2$ of about 83, a % $Li_2O$ of about 1.0, and a color of about 91/−0.5/0.5.

In a more detailed feature of the invention, the powder may have a bulk density of about 0.071 g/ml, a BET surface area of about 800 $m^2/g$, a loss on drying at 105° C. of about 10-15%, a 20% slurry pH of about 9-10, a % $SiO_2$ of about 86.5, a % $Li_2O$ of about 1.04, and a color of about 93/0.0/0.6.

Additional objects, as well as aspects, features and advantages, of the present invention will be set forth in part in the description which follows, and in part will be obvious from the description or may be learned by practice of the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DETAILED DESCRIPTION OF THE INVENTION

As noted above, it is an object of the present invention to provide a novel technique for mitigating alkali-silica reaction in concrete. In this regard, according to one aspect of the invention, there is disclosed a novel concrete admixture for mitigating alkali-silica in concrete, the concrete admixture comprising (i) a lithium-stabilized dispersion of silica and/or (ii) a powder obtained by drying the aforementioned lithium-stabilized dispersion of silica.

In addition, according to another aspect of the invention, there is provided a novel concrete mix. The concrete mix may comprise the following components: (i) a cement; (ii) an aggregate; (iii) water; and (iv) a lithium-stabilized dispersion of silica and/or a powder obtained by drying the lithium-stabilized dispersion of silica. The concrete mix may further comprise one or more supplementary cementitious materials, which may include, but are not limited to, conventional supplementary cementitious materials like Class F fly ash, silica fume, and metakaolin.

The cement for the above-described concrete mix may be conventional and may consist of a single type of cement or may comprise two or more types of cement. For example, the cement may comprise a Type I/II Portland cement.

The aggregate for the above-described concrete mix may be conventional and may consist of a single type of aggregate or may comprise two or more types of aggregate. For example, the aggregate may comprise at least one of the following types of aggregate: a mixed volcanic aggregate, a granite-based aggregate, a limestone-based aggregate, and a sand/gravel-based aggregate.

The lithium-stabilized dispersion of silica for the above-described concrete mix may be conventional and may consist of a single type of lithium-stabilized dispersion of silica or may comprise two or more types of lithium-stabilized dispersions of silica. For example, the lithium-stabilized dispersion of silica may comprise one or more of a lithium-stabilized dispersion of fumed silica, a lithium-stabilized dispersion of silica gel, a lithium-stabilized dispersion of silica fume, and a lithium-stabilized dispersion of precipitated silica. A preferred lithium-stabilized dispersion of silica may be a lithium-stabilized colloidal silica, an example of which may be LiSol™ 6 lithium-stabilized colloidal silica, which is commercially available from the present applicant/assignee, Nyacol Nano Technologies, Inc. (Ashland, MA).

Lithium-stabilized colloidal silica may be prepared by at least the following three types of methods: (1) Deionization of sodium silicate to prepare silicic acid, which is then condensation polymerized to form colloidal silica particles. The particle size may be controlled by process parameters such as temperature, concentration, addition rates, and any additives. The process can be operated in batch or column formats or hybrid processes. (2) Deionization of sodium- or potassium- or ammonia-stabilized colloidal silica in a column or batch mode, followed by replacing the alkali cation with lithium. This process does not produce as low of an impurity profile as the first method. (3) Condensation polymerization of high purity silicic acid prepared from tetramethyl orthosilicate (TMOS) or tetraethyl orthosilicate (TEOS) with lithium in the starting reaction mix.

A more detailed protocol for preparing a lithium-stabilized colloidal silica for use in the present invention may be as follows: First, in a stirred tank reactor, 20,000 lbs. of deionized water is prepared, and 55 lbs. of lithium hydroxide powder is dissolved in the deionized water, thereby creating a 0.1% $Li_2O$ solution. Next, 6000 lbs. of sodium silicate with a $SiO_2/Na_2O$ ratio of 3.22 is diluted to 4.5% $SiO_2$ with deionized water. Next, the dilute silicate is passed through a column of IR120 ion exchange resin in the hydrogen form, creating a pseudo stable silicic acid solution. Next, the silicic acid is fed into the lithium hydroxide solution over 10 hours at 47° C., and the resulting lithium stabilized silica sol is concentrated to 15% $SiO_2$. The foregoing concentrated colloidal sol is sold by the present applicant/assignee (Nyacol Nano Technologies, Inc., Ashland, MA) as LiSol™ 6 lithium-stabilized colloidal silica, which has the following properties: (1) density: 1.085 g/ml; (2) pH: 9.8; (3) % $Li_2O$: 0.20; (4) viscosity: 4 cps; (5) conductivity: 4130 uS; (5) gravimetric solids: 13.7%; (6) surface area by Sears method: 513 m$^2$/g; and (7) particle size (by calculation): 5.3 nm.

It is to be noted that adjustment of the above-described process conditions may be used to produce lithium-stabilized colloidal silicas of other particle sizes. Particle size may be controlled by the time, temperature, and feed rates used in the process. Larger particle sizes may be prepared by a buildup method, in which silica is deposited on existing particles to grow the particles to a desired size.

In general, particle sizes may range from 3 nm to 125 nm, with the preferred particle size depending on the goals of the formulation. The colloidal silica can only be concentrated to certain solids levels according to the particle size since the viscosity will increase rapidly, leading to gelation as the threshold is exceeded. For example, 6 nm can be made to 15% to 17% by weight, 8 nm can be made to 30%, and 20 nm and larger can be made to 40% or 50% solids by weight. It is advantageous for shipping costs and reduced handling costs to use higher solids; however, the reduced specific surface area may reduce the effectiveness of the product.

An example of a lithium-stabilized colloidal silica having an average particle size of 3 nm is sold by the present applicant/assignee (Nyacol Nano Technologies, Inc., Ashland, MA) as LiSol™ 3 lithium-stabilized colloidal silica. The foregoing product was prepared using essentially the same process as described above for LiSol™ 6 lithium-stabilized colloidal silica, except that the process conditions were adjusted to increase the surface area to 800 m$^2$/g.

As noted above, in addition to using, or instead of using, a lithium-stabilized dispersion of silica, one may use a powder that may be obtained by drying the lithium-stabilized dispersion of silica. According to one embodiment, such drying may be spray-drying. In general terms, such spray-drying may comprise feeding the colloidal sol into a rotating high-speed atomizer to form a spray and then mixing the foregoing spray with high temperature air. The nano-structured powder that results may be conveyed from a drying chamber to a cyclone for separation of the powder from the drying air.

An example of a powder as described above may be obtained by spray-drying LiSol™ 6 lithium-stabilized colloidal silica. Such a powder, which is designated herein as LiSol 6-SD powder, may be prepared using a GEA MOBILE MINOR® Model 53 spray dryer (GEA North America, Columbia, MD), with a liquid feed rate of 40 ml/min and a discharge temperature of 200° F. The powder may have the following properties: (1) bulk density: 0.86 g/ml; (2) Brunauer-Emmett-Teller (BET) surface area: 500 m$^2$/g; (3) loss on drying at 105° C.: 12.6%; (4) 10% slurry pH: 10.5; (5) % $SiO_2$: 83; (6) % $Li_2O$: 1.0; and (7) color: 91/–0.5/0.5.

Another example of a powder as described above may be obtained by spray-drying LiSol™ 3 lithium-stabilized colloidal silica under the same types of conditions described above to obtain LiSol 6-SD powder. The powder, which may be identified herein as LiSol 3-SD powder, may have the following properties: (1) bulk density: 0.071 g/ml; (2) BET surface area: 800 m$^2$/g; (3) loss on drying at 105° C.: 10-15%; (4) 20% slurry pH: 9-10; (5) % $SiO_2$: 86.5; (6) % $Li_2O$: 1.04; and (7) color: 93/0.0/0.6.

As can be appreciated, when including the lithium-stabilized colloidal silica or corresponding powder of the present invention in a concrete mix, one may wish to use an amount that mitigates alkali-silica reaction yet, at the same time, does not adversely affect the composition of the concrete mix in other respects. To this end, one may wish to consider whether the material is to be regarded merely as a lithium source and/or whether the material is to be regarded as a silica source to replace cement or supplementary cementitious materials like Class F fly ash or silica fume. In addition, one may also wish to consider whether the material may be effective in controlling alkali-silica reaction, without requiring fly ash or silica fume, for a range of aggregate materials.

In this regard, the present inventor notes that the American Association of State Highway and Transportation Officials (AASHTO) makes the following recommendations regarding the mitigation of alkali-silica reaction: (1) for reactive aggregates, substitute 20% of the cement with Class F fly ash; and (2) for reactive aggregates, determine the amount of lithium to be added as Li/(Na+K)=0.74 as a mol ratio. (Na+K) is commonly expressed as $Na_2Oe$.

Using the first AASHTO recommendation above, where, for example, the cement that is used may be 440 grams of Type I/II Portland cement, a 20% substitution would be 440 grams×0.2=88 grams of silica solids. For LiSol™ 6 lithium-stabilized colloidal silica, 88 grams of silica solids would equate to 642 grams of LiSol™ 6 lithium-stabilized colloidal silica, which seems to be a very high amount and would be impractical from a cost and formulating point of view.

Using the second AASHTO recommendation above, where, for example, the cement is 440 grams of Type I/II Portland cement and has a $Na_2Oe$ of 0.46%, the mass of $Na_2Oe$ would be 2.024 grams, or 0.0653 gmol. The amount of Li to be added would be Li=0.74×0.0653=0.0483 gmol Li×7 grams/gmol=0.338 grams of Li. LiSol™ 6 is 0.2% $Li_2O$, which is equivalent to 0.09% Li. Accordingly, one would need to add 0.338/0.0009-375 grams of LiSol™ 6 if only serving as a lithium source, which again is a high result that is impractical from a cost and formulating point of view.

An alternative approach to the above would be to consider that the lithium-stabilized colloidal silica may be regarded as a silica source in place of a portion of the cement or supplementary cementitious materials. Such an approach may be analogous to the approaches discussed above in Belkowitz and Zeidan in connection with sodium-stabilized colloidal silica. In the approaches of Belkowitz and Zeidan, cement is replaced with the sodium-stabilized colloidal silica. Based on the examples in Belkowitz and Zeidan, the silica addition would be in the range of 20 to 48 grams of $SiO_2$ for Belkowitz and would be 26 grams of $SiO_2$ for Zeidan; however, it should be noted that only the alkali-silica reaction performance of Belkowitz meets both the 14-day and 28-day requirement of 0.1% maximum expansion.

In contrast with the $SiO_2$ amounts described above for admixtures of sodium-stabilized colloidal silica, significantly smaller amounts of $SiO_2$ may be used in connection with admixtures of lithium-stabilized colloidal silica in accordance with the present invention. More specifically, using LiSol™ 6 lithium-stabilized colloidal silica, amounts of $SiO_2$ ranging from 1.95 grams $SiO_2$ to 15.6 grams of $SiO_2$ may be used. The lithium-stabilized colloidal silica need not be substituted for, and preferably is not substituted for, the cement, as this keeps the $Na_2Oe$ higher, and the constant cement amount may be helpful for compressive strength. Also, the water in the colloidal silica is preferably not subtracted from the water to be added. Instead, the colloidal silica may be diluted with the standard 0.47 water-to-cement ratio, and the aggregate and cement may be blended with this pre-diluted mixture. It is believed that this approach may give a better dispersion of the lithium-stabilized colloidal silica in the mixture.

According to the present invention, an exemplary formulation of a 3000 psi mix for use in preparing a 1 cubic yard of concrete may be as follows: (i) cement: 517 lbs; (ii) sand: 1560 lbs; (iii) stone/aggregate: 1600 lbs; (iv) water: 275 lbs (i.e., approximately 33 gallons); and (v) LiSol™ 6 lithium-stabilized colloidal silica: 3 lbs to 240 lbs, depending on the alkali-silica reaction of the unmitigated formulation.

EXAMPLES

The following examples are given for illustrative purposes only and are not meant to be a limitation on the invention described herein or on the claims appended hereto.
Materials:
The following materials were used as specified in the examples below:
1. Cement-Type I/II Portland cement from Continental Cement, Davenport Plant (Buffalo, IA), meeting ASTM C150 and TM standard specifications. The $Na_2Oe$ for the cement is 0.46%.
2. Mixed volcanic-origin aggregate—aggregate of mixed volcanic-origin crushed and graded to the required sizes for ASTM C1260 standard specifications.
3. Granite-origin aggregate—crushed and graded to the required size for ASTM C1260 standard specifications.
4. Limestone-origin aggregate—crushed and graded to the required size for ASTM C1260 standard specifications.
5. Empire Sand (Empire Sand & Gravel Co., Inc., Billings, MT)—graded to the required size for ASTM C1260 standard specifications
6. Class F fly ash—Boral Prairie State—55.2% $SiO_2$+ 18.2% $Al_2O_3$+10.9% $Fe_2O_3$. Total 84.4%.
7. Water—regular tap water.
8. LiSol™ 6 lithium-stabilized colloidal silica, Nyacol Nano Technologies, Inc., Ashland, MA.
9. NexSil 5—a 5 nm sodium-stabilized colloidal silica with 15% $SiO_2$ content, Nyacol Nano Technologies, Inc., Ashland, MA
10. NexSil 20A—a 20 nm, low sodium colloidal silica produced at 30% $SiO_2$ and pH 3, Nyacol Nano Technologies, Inc., Ashland, MA All alkali-silica reaction and other concrete testing was conducted by Element Materials Corp., St. Paul, MN, in its accredited concrete laboratory.

Example 1: Mixed Volcanic-Origin Aggregate Screening Test

Mixed volcanic-origin aggregate is known to show high expansion in the ASTM C1260 test. The formulation of TABLE 1 below was prepared, cast into test bars, and cured and aged as specified, with periodic measurements of expansion made.

TABLE 1

| Ingredient | Weight (g) |
| --- | --- |
| Type I/II Portland cement | 440 |
| Aggregate (ASTM C1260, Table 1 Grading) | 990 |
| Water | 207 |
| LiSOL ™ 6 lithium-stabilized colloidal silica | 26 |
| Total mass without LiSOL ™ 6 lithium-stabilized colloidal silica | 1637 |
| Total mass with LiSOL ™ 6 lithium-stabilized colloidal silica | 1663 |
| Water/Cement Ratio | 0.46 |

The expansion test results are shown below in TABLE 2. As can be seen, it is clear that mixed volcanic-origin aggregate has high expansion after 14 days and requires mitigation. The addition of low levels of LiSol™ 6 lithium-stabilized colloidal silica is effective in reducing alkali-silica reaction and an addition of 0.46 wt % as $SiO_2$ enables even the Federal Aviation Administration (FAA) specification to be met (i.e., no more than 0.1% expansion at 28 days using the accelerated mortar bar test). These results also show that lithium-stabilized colloidal silica is surprisingly effective and performs in an unexpected way as a lithium source for alkali-silica reaction control.

TABLE 2

Mixed Volcanics Aggregate-% Length Change Average of 3 Measurements

| Specimen | Wt % SiO2 from Lisol 6 | Day 0 | Day 2 | Day 7 | Day 11 | Day 14 | Day 28 |
|---|---|---|---|---|---|---|---|
| Control, no LiSOL 6 | 0 | 0.000% | 0.096% | 0.184% | 0.232% | 0.290% | 0.32% |
| LiSOL 6 at 13 Grams | 0.11 | 0.000% | 0.023% | 0.054% | 0.096% | 0.135% | |
| LiSOL 6 at 26 Grams | 0.23 | 0.000% | 0.012% | 0.049% | 0.077% | 0.110% | |
| LiSOL 6 at 52 Grams | 0.46 | 0.000% | 0.000% | 0.035% | 0.039% | 0.054% | 0.080% |
| LiSOL 6 at 104 Grams | 0.9 | 0.000% | 0.008% | 0.028% | 0.039% | 0.054% | 0.066% |

Example 2: Empire Sand Screening Test

Empire sand is a known poor performer for alkali-silica reaction. The standard mix design described in Example 1 was used, except that Empire sand was substituted for the mixed volcanic-origin material. The test was carried out to 56 days to demonstrate long-term effectiveness of the LiSol™ 6 lithium-stabilized colloidal silica. As can be seen below in TABLE 3, LiSol™ 6 lithium-stabilized colloidal silica is effective in controlling alkali-silica reaction up to 56 days.

TABLE 3

Empire Sand-% Length Change Average of 3 Measurements

| Specimen | Wt % SiO2 from Lisol 6 | Day 0 | Day 2 | Day 7 | Day 11 | Day 14 | Day 28 | Day 56 |
|---|---|---|---|---|---|---|---|---|
| Control, no LiSOL 6 | 0 | 0.000% | 0.012% | 0.060% | 0.160% | 0.220% | 0.350% | 0.390% |
| LiSOL 6 at 52 Grams | 0.46 | 0.000% | 0.000% | 0.014% | 0.021% | 0.028% | 0.030% | 0.056% |
| LiSOL 6 at 104 Grams | 0.9 | 0.000% | 0.000% | 0.011% | 0.014% | 0.019% | 0.028% | 0.038% |

Example 3: Granite-Based Aggregate

Granite-based aggregate was substituted in the formulation of Example 1, and alkali-silica reaction aging tests were conducted for 28 days. The granite-based aggregate was already a good performer and required no mitigation. Nevertheless, as can be seen below in TABLE 4, the addition of LiSol 6TM lithium-stabilized colloidal silica further reduced alkali-silica reaction. Moreover, this example shows no negative effect in a known good system.

TABLE 4

Granite based aggregate-% Length Change Average of 3 Measurements

| Specimen | Wt % SiO2 from Lisol 6 | Day 0 | Day 2 | Day 7 | Day 11 | Day 14 | Day 28 |
|---|---|---|---|---|---|---|---|
| Control, no LiSOL 6 | 0 | 0.000% | 0.001% | 0.015% | 0.026% | 0.040% | 0.052% |
| LiSOL 6 at 52 Grams | 0.46 | 0.000% | 0.000% | 0.017% | 0.027% | 0.030% | 0.034% |
| LiSOL 6 at 104 Grams | 0.9 | 0.000% | 0.000% | 0.008% | 0.013% | 0.018% | 0.023% |

Example 4: Limestone-Based Aggregate

Limestone-based aggregate was substituted in the formulation of Example 1, and alkali-silica reaction aging tests were conducted for 28 days. The limestone-based aggregate was already a good performer and required no mitigation. Nevertheless, as can be seen below in TABLE 5, the addition of LiSol 6TM lithium-stabilized colloidal silica further reduced alkali-silica reaction. Moreover, this example shows no negative effect in a known good system.

TABLE 5

Limestone based Aggreagte-% Length Change Average of 3 Measurements

| Specimen | Wt % SiO2 from Lisol 6 | Day 0 | Day 2 | Day 7 | Day 11 | Day 14 | Day 28 |
|---|---|---|---|---|---|---|---|
| Control, no LiSOL 6 | 0 | 0.000% | 0.004% | 0.004% | 0.009% | 0.010% | 0.033% |
| LiSOL 6 at 52 Grams | 0.46 | 0.000% | −0.004% | −0.004% | 0.000% | 0.004% | 0.022% |
| LiSOL 6 at 104 Grams | 0.9 | 0.000% | 0.000% | 0.001% | 0.003% | 0.003% | 0.018% |

Example 5

This example was run to determine if low sodium colloidal silica can successfully mitigate alkali-silica reaction or if a lithium colloidal silica is required to mitigate alkali-silica reaction. NexSil 20A colloidal silica is an acidic colloidal silica produced by Nyacol Nano Technologies, Inc. (Ashland, MA). NexSil 20A colloidal silica is 30% $SiO_2$, with a sodium content of 250 ppm (as Na) and a pH of 2.7. This amorphous silica is expected to mitigate alkali-silica reaction based on the same type of mechanism as fly ash, silica fume or metakaolin. The active silica and alumina contents react with the excess alkali in the pore space and, in so doing, suppress alkali-silica reaction. However, large amounts of the supplementary cementitious materials are used to achieve low alkali-silica reaction. These tests were run at the same $SiO_2$ levels as the Lisol™ 6 lithium-stabilized colloidal silica tests above.

NexSil 20A colloidal silica was tested with both the Empire sand and mixed volcanic aggregates. As can be seen below in TABLE 6, the results were promising at 14 days, but failed at 28 days. It is believed that this is due to the amorphous silica reacting with excess pore alkali, and, once it is used up, there is nothing to prevent alkali-silica reaction from proceeding. These results further confirm the surprising performance of lithium-stabilized colloidal silica.

TABLE 6

| Specimen | Wt % SiO2 from 20A | 0 | 2 | 7 | 11 | 14 | 28 |
|---|---|---|---|---|---|---|---|
| Control Lab Test Data-Empire Sand-% Length Change Average of 3 Measurements | | | | | | | |
| Control, no NexSil 20A | 0 | 0.000% | 0.012% | 0.060% | 0.160% | 0.220% | 0.350% |
| NexSil 20A at 52 Grams | 0.92 | 0.000% | 0.008% | 0.016% | 0.024% | 0.037% | 0.155% |
| Nexsil 20A at 104 grams | 1.8 | 0.000% | 0.001% | 0.005% | 0.019% | 0.024% | 0.135% |
| Control Lab Test Data-Mixed Volcanics-% Length Change Average of 3 Measurements | | | | | | | |
| Control, no NexSil 20A | 0 | 0.000% | 0.096% | 0.184% | 0.232% | 0.290% | 0.320% |
| NexSil 20A at 52 Grams | 0.92 | 0.000% | 0.007% | 0.018% | 0.055% | 0.087% | 0.245% |
| NexSil 20A at 104 Grams | 1.8 | 0.000% | 0.009% | 0.017% | 0.031% | 0.052% | 0.141% |

Example 6

This example compares NexSil 5 sodium-stabilized colloidal silica to LiSol™ 6 lithium-stabilized colloidal silica with Empire sand and mixed volcanic aggregates. The sodium of NexSil 5 sodium-stabilized colloidal silica would be expected to be detrimental to alkali-silica reaction performance.

As can be seen below in TABLE 7, while there was some difference between the aggregate types, they all fail at 28 days-similar to what was found in Example 5 with NexSil 20A colloidal silica.

TABLE 7

| Specimen | Wt % SiO2 from Nexsil 5 | 0 | 2 | 7 | 11 | 14 | 28 |
|---|---|---|---|---|---|---|---|
| Control Lab Test Data-Mixed Volcanics-% Length Change Average of 3 Measurements | | | | | | | |
| Control, noNexSil 5 | 0 | 0.000% | 0.096% | 0.184% | 0.232% | 0.290% | 0.320% |
| NexSil 5 at 52 Grams | 0.46 | 0.000% | 0.012% | 0.020% | 0.130% | 0.260% | 0.306% |
| Nexsil 5 at 104 grams | 0.92 | 0.000% | 0.016% | 0.023% | 0.120% | 0.240% | 0.265% |
| Control Lab Test Data-Empire Sand-% Length Change Average of 3 Measurements | | | | | | | |
| Control, no NexSil 5 | 0 | 0.000% | 0.012% | 0.060% | 0.160% | 0.220% | 0.350% |
| NexSil 5 at 52 Grams | 0.46 | 0.000% | 0.006% | 0.014% | 0.052% | 0.074% | 0.192% |
| Nexsil 5 at 104 grams | 0.92 | 0.000% | 0.004% | 0.014% | 0.034% | 0.048% | 0.173% |

Example 7: LiSol 6-SD Powder

LiSol 6-SD powder was prepared as described above. This example was run to evaluate the use of a nano-structured powder in the ASTM C1260 procedure. A powder would offer advantages in terms of ease of use and transportation cost and would avoid the handling of bulk liquids and the related issues of water-to-cement ratio and slump control.

The LiSol 6-SD powder was blended with the fine aggregate as part of the ASTM C1260 procedure and then the bars were cast and aged according to the procedure.

As can be seen below in TABLES 8 and 9, the LiSol 6-SD powder was surprisingly good at very low addition levels. In fact, the results show that as little as 0.1% by weight is effective in controlling alkali-silica reaction in the Empire sand aggregate at 14 days.

TABLE 8

| ASTM C1260 Standard Mix Design | Wt, Grams | Wt % |
|---|---|---|
| Cement Type I/II Continental Davenport | 440 | 26.7% |
| Aggregate (C1260 Table 1 Grading) | 990 | 60.2% |
| Water-Cement Ratio | 207 | 12.6% |
| Lisol 6-SD | 8.18 | 0.5% |
|  | 1645.18 |  |
| Water/cement ratio | 0.47 |  |

TABLE 9

| | Empire Sand-% Length Change Average of 3 Measurements | | | | | |
|---|---|---|---|---|---|---|
| Specimen | Wt % SiO2 from Lisol 6-SD | Day 0 | Day 2 | Day 7 | Day 11 | Day 14 |
| Control, no LiSOL 6-SD | 0 | 0.000% | 0.012% | 0.060% | 0.160% | 0.210% |
| Lisol 6-SD at 1.64 grams | 0.1 | 0.000% | 0.004% | 0.008% | 0.019% | 0.031% |
| Lisol 6-SD at 3.27 grams | 0.2 | 0.000% | 0.007% | 0.014% | 0.021% | 0.032% |
| Lisol 6-SD at 8.18 grams | 0.5 | 0.000% | 0.006% | 0.014% | 0.021% | 0.034% |

Example 8: LiSol 3-SD Powder

LiSol 3-SD powder was prepared as described above and tested in the ASTM C1260 protocol using the Empire sand aggregate. As seen below in TABLE 10, LiSol 3-SD powder was also very good at low addition levels. In fact, the results show that as little as 0.1% by weight is effective in controlling alkali-silica reaction at 14 days.

TABLE 10

| Specimen | Wt % SiO2 from Lisol 3-SD | Day 0 | Day 2 | Day 7 | Day 11 | Day 14 |
|---|---|---|---|---|---|---|
| Control, no LiSOL 3-SD | 0 | 0.000% | 0.008% | 0.055% | 0.150% | 0.190% |
| Lisol 3-SD at 1.64 grams | 0.1 | 0.000% | 0.001% | 0.023% | 0.045% | 0.066% |
| Lisol 3-SD at 3.27 grams | 0.2 | 0.000% | 0.001% | 0.015% | 0.038% | 0.059% |
| Lisol 3-SD at 8.18 grams | 0.5 | 0.000% | 0.002% | 0.024% | 0.045% | 0.064% |

Empire Sand-% Length Change Average of 3 Measurements

In summary, the above examples show that lithium-stabilized colloidal silicas and powders prepared from lithium-stabilized colloidal silicas are highly effective in controlling alkali-silica reaction in concrete. The LiSol lithium-stabilized colloidal silicas and LiSol-SD powder materials are effective at much lower levels of use than calculated or predicted by existing studies involving lithium nitrate. The lithium-stabilized colloidal silicas and related powders are also highly effective additives, performing at much lower levels than existing supplementary cementitious materials used to mitigate alkali-silica reaction.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A concrete mix, the concrete mix comprising:
   (a) a cement;
   (b) an aggregate;
   (c) an alkali-silica reaction mitigating agent, the alkali-silica reaction mitigating agent comprising at least one of (i) a lithium-stabilized dispersion of silica and (ii) a powder obtained by drying the lithium-stabilized dispersion of silica, wherein the lithium-stabilized dispersion of silica comprises a lithium-stabilized colloidal silica, wherein the lithium-stabilized colloidal silica comprises silica particles having a particle size of about 6 nm, and wherein the lithium-stabilized colloidal silica has a density of about 1.085 g/ml, a pH of about 9.8, a % $Li_2O$ of about 0.20, a viscosity of about 4 cps, a conductivity of about 4130 uS, a gravimetric solids percentage of about 13.7%, a surface area by Sears method of about 513 $m^2/g$, and a calculated particle size of about 5.3 nm; and
   (d) water.

2. A concrete mix, the concrete mix comprising:
   (a) a cement;
   (b) an aggregate;
   (c) an alkali-silica reaction mitigating agent, wherein the alkali-silica reaction mitigating agent comprises a powder obtained by drying a lithium-stabilized dispersion of silica and wherein the lithium-stabilized dispersion of silica is a lithium-stabilized colloidal silica; and
   (d) water.

3. The concrete mix as claimed in claim 2, wherein the lithium-stabilized colloidal silica comprises silica particles having a particle size of about 3 nm to 125 nm.

4. The concrete mix as claimed in claim 2, wherein the lithium-stabilized colloidal silica comprises silica particles having a particle size of about 6 nm.

5. The concrete mix as claimed in claim 2, wherein the lithium-stabilized colloidal silica comprises silica particles having a particle size of about 3 nm.

6. The concrete mix as claimed in claim 2 wherein the powder has a bulk density of about 0.86 g/ml, a BET surface area of about 500 $m^2/g$, a loss on drying at 105° C. of about 12.6%, a 10% slurry pH of about 10.5, a % $SiO_2$ of about 83, a % $Li_2O$ of about 1.0, and a color of about 91/−0.5/0.5.

7. The concrete mix as claimed in claim 2 wherein the powder has a bulk density of about 0.071 g/ml, a BET surface area of about 800 $m^2/g$, a loss on drying at 105° C. of about 10-15%, a 20% slurry pH of about 9-10, a % $SiO_2$ of about 86.5, a % $Li_2O$ of about 1.04, and a color of about 93/0.0/0.6.

8. The concrete mix as claimed in claim 2, further comprising one or more supplementary cementitious materials.

9. A concrete mix, the concrete mix comprising:
   (a) cement;
   (b) sand;
   (c) stone/aggregate;
   (d) water; and
   (e) a lithium-stabilized colloidal silica, wherein the lithium-stabilized colloidal silica has a density of about 1.085 g/ml, a pH of about 9.8, a % $Li_2O$ of about 0.20, a viscosity of about 4 cps, a conductivity of about 4130 uS, a gravimetric solids percentage of about 13.7%, a surface area by Sears method of about 513 $m^2/g$, and a calculated particle size of about 5.3 nm.

10. The concrete mix as claimed in claim 9 wherein said concrete mix is a 3000 psi concrete mix for preparing a 1 cubic yard of concrete and wherein said cement is present in said concrete mix in an amount constituting 517 lbs, said sand is present in said concrete mix in an amount constituting 1560 lbs, said stone/aggregate is present in said concrete mix in an amount constituting 1600 lbs, said water is present in said concrete mix in an amount constituting 275 lbs, and said lithium-stabilized colloidal silica is present in said concrete mix in an amount ranging from 3 lbs to 240 lbs.

11. A method of making a concrete structure, the method comprising the steps of:
   providing the concrete mix of claim 2,
   (b) then, casting the concrete mix to a desired form; and
   (c) allowing the cast concrete mix to cure.

12. The method as claimed in claim 11, wherein the lithium-stabilized colloidal silica comprises silica particles having a particle size of about 3 nm to 125 nm.

13. The method as claimed in claim 12, wherein the lithium-stabilized colloidal silica comprises silica particles having a particle size of about 6 nm.

14. The method as claimed in claim 13, wherein the lithium-stabilized colloidal silica has a density of about 1.085 g/ml, a pH of about 9.8, a % $Li_2O$ of about 0.20, a viscosity of about 4 cps, a conductivity of about 4130 uS, a gravimetric solids percentage of about 13.7%, a surface area by Sears method of about 513 $m^2/g$, and a calculated particle size of about 5.3 nm.

15. The method as claimed in claim 12, wherein the lithium-stabilized colloidal silica comprises silica particles having a particle size of about 3 nm.

16. The method as claimed in claim 11 wherein the powder has a bulk density of about 0.86 g/ml, a BET surface area of about 500 $m^2/g$, a loss on drying at 105° C. of about 12.6%, a 10% slurry pH of about 10.5, a % $SiO_2$ of about 83, a % $Li_2O$ of about 1.0, and a color of about 91/−0.5/0.5.

17. The method as claimed in claim 11 wherein the powder has a bulk density of about 0.071 g/ml, a BET surface area of about 800 $m^2/g$, a loss on drying at 105° C. of about 10-15%, a 20% slurry pH of about 9-10, a % $SiO_2$ of about 86.5, a % $Li_2O$ of about 1.04, and a color of about 93/0.0/0.6.

* * * * *